Aug. 30, 1966 D. S. SCHREIBER 3,269,180
CAPACITIVE ELECTRODE FOR FLOW MEASUREMENT IN OPEN CHANNELS
Original Filed March 26, 1962 2 Sheets-Sheet 1
FIG.1A  FIG.1B
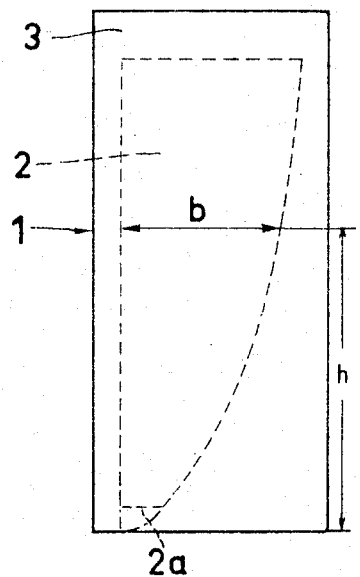
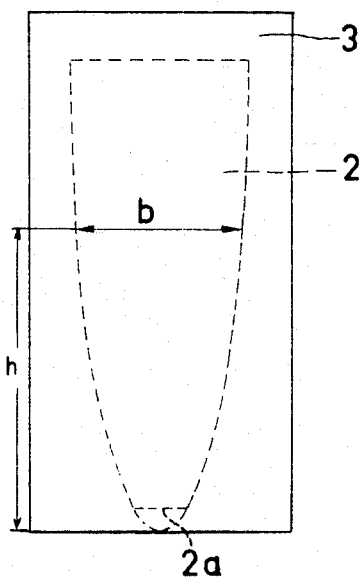
FIG.1C  FIG.1D
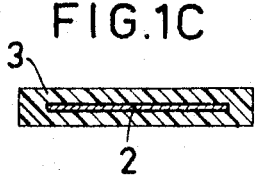
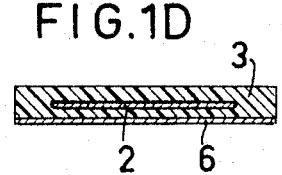
FIG.1E  FIG.1F
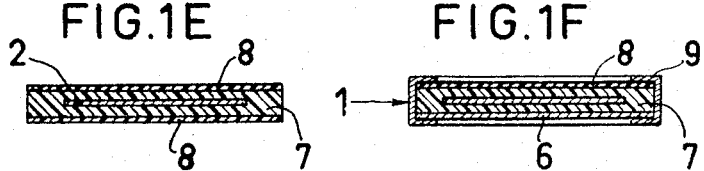

CAPACITIVE ELECTRODE FOR FLOW MEASUREMENT IN OPEN CHANNELS

Dag Sigurdsson Schreiber, Lidingo, Sweden, assignor to AB Deber-Kontroll, Lidingo, Sweden
Continuation of application Ser. No. 182,225, Mar. 26, 1962. This application Nov. 5, 1965, Ser. No. 506,567
Claims priority, application Sweden, Mar. 28, 1961, 3,254/61
8 Claims. (Cl. 73—215)

This application is a continuation of my application Serial No. 182,225 filed March 26, 1962, now abandoned.

For the measurement of flow of water in open channels a constriction of the flow is provided in different manners, and the water level is measured at the upstream side of the constriction. If the flow, i.e. the quantity passing per unit time, is denoted by $Q$ and the level before the constriction by $h$, the following relation is obtained.

$$Q = k_1 \cdot h^\alpha \qquad (1)$$

where $\alpha$ is an exponent, constant for every measuring device and depending on the constriction etc.

In the device according to the invention a capacitive level meter is used as a flow meter by measuring the value $h$ with the aid thereof. In a capacitive level meter the scale is a linear function of the capacitance of the electrode. By shaping the electrode in a suitable manner the scale of the capacitive level meter may be made linear with respect to the flow. As the value measured by the level meter is a direct current, the total quantity may be obtained by integration by means of a usual ampere hour meter in the measuring circuit.

In a capacitive flow meter $Q$ is obtained as:

$$Q = k_2 \cdot C \qquad (2)$$

where $C$ is the capacitance of the electrode at the flow value $Q$.

From (1) and (2) is obtained:

$$C = \frac{k_1}{k_2} \cdot h^\alpha \qquad (3)$$

On the drawing there are shown embodiments of the invention, which are to be considered as examples only.

FIGS. 1A and 1B show two different shapes of the electrode for a venturi channel, in the form of a plate.

FIGS. 1C–1F show transverse sections of electrode plates for different conditions of use.

Figure 2A:
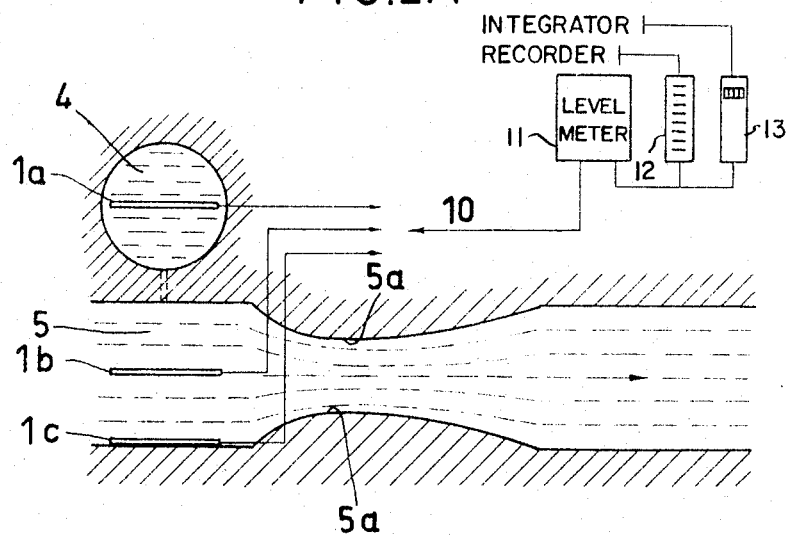
FIG. 2A shows a horizontal view of a venturi channel, and an electrode plate positioned in two different manners therein or in a well communicating with the channel, together with associated measuring instruments.
Figure 2B:
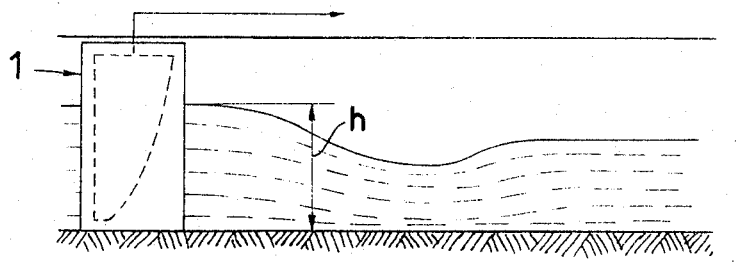
FIG. 2B shows a vertical section of the venturi channel.

The electrode 1 is shaped as a conductive metal plate 2 according to the dashed lines in FIGS. 1A and 1B. It is wholly insulated by means of a dielectric 3 of constant thickness. It is essential that that surface of the electrode, which is in contact with the liquid to be measured, is water-repelling. The best material in this respect is polytetrafluoroethylene (Teflon). Also polytrifluorochloroethylene (Kel-F) or silicones may be used, for instance. The said plate is placed vertically in the water, the level of which is a measure of the flow $Q$. The plate 2 is cut off at its bottom along the line 2a in order to obtain a sufficient insulation relative to the bottom of the channel.

If $A$ is the area of the part of the plate, which is covered by the water up to the height $h$, and $C_0$ is the capacitance at $h=0$, $C$ is obtained according to the relationship:

$$C = C_0 + k_3 \cdot A \qquad (4)$$

Thus $$A = \frac{C - C_0}{k_3}$$

or in combination with Equation 3;

$$A = \frac{k_1}{b_2 \cdot k_3} \cdot h^\alpha - \frac{C_0}{k_3} \qquad (5)$$

If one edge of the plate is a vertical line as in FIG. 1A, the area $A$ is $$A = \int_0^h b(dh) \qquad (6)$$

where $b$ is the width of the plate at the height $h$.

The Equations 5 and 6 give $$b = \frac{k_1}{k_2 k_3} \cdot \alpha \cdot h^{(\alpha-1)} = k \cdot \alpha \cdot h^{(\alpha-1)} \qquad (7)$$

This is the equation of the curve in FIG. 1A.

The same discussion also applies if the straight edge of the plate in FIG. 1A is formed as an oblique line or a curve or if the whole electrode is shaped as a bar or wire with constant area per unit of length but bent in such a way that the capacitance of the electrode in the liquid to be measured varies linearly with the flow.

If the electrode is placed at 1a in a well 4, which at its bottom communicates with the channel 5, FIG. 2A, or is placed at 1b in the channel, it is surrounded at both of its sides by the water up to the height $h$.

If it is placed at 1c adjacent to the wall of the channel, then only the side thereof facing the water can be used for measurement. In order that the side thereof facing the wall shall not influence the measured value through remaining water or impurities, this side should be covered by a metal shield or the like 6, which is fixedly connected or bonded with the insulation 3, as shown in FIG. 1D and as will be described later in more detail. The capacitance between the shield 6 and the measuring plate 2 is constant and independent of the water level.

It is essential with respect to the accuracy of measurement that the thickness of the insulation 3 is constant and that the capacitance does not vary with the temperature. It may therefore be suitable to constitute the insulation of two or more layers of different insulating materials, the outermost layer being a water-repelling one, see FIG. 1E. The measuring plate 2 is here surrounded by an insulating material 7 having suitable dielectric characteristics, and on this layer is placed another insulating material 8 which is water-repelling, for instance polytetrafluoroethylene (Teflon), polytrifluorochloroethylene (Kel-F) or silicones, for instance in the form of a foil or a varnish.

The FIG. 1F shows a complete electrode intended to be mounted at the wall. The measuring plate 2 is surrounded by an insulating layer 7 with constant thickness and good dielectric quality. At the side facing the water the insulating layer is covered with a water-repelling insulation layer 8, as in FIG. 1E, while the side thereof facing the channel wall is covered with a metal network or sheet 6, as in FIG. 1D.

In order to obtain good mechanical stability the electrode 1 is surrounded at its edges by a frame 9 of metal or another material.

According to FIG. 2A the electrode 1 is connectable through the cable 10 to a capacitive level meter 11 of known construction with a linear flow scale. To this meter 11 may be connected an indicating or recording instrument 12 and an integrating instrument 13. In this FIG. 2A it is intended that the cable 10 is connected to the electrode at location $1a$ or $1b$ or $1c$, which is used in each special case.

The device according to the invention has many advantages in comparison with devices hitherto used for measuring the flow in channels, where the level is measured in a separate measuring well or directly in the channel by means of float mechanisms and mechanical transformation of the movement of the float member into a linear value of the flow.

The capacitive electrode may be shaped as a plate, which is strong and is easy to clean. It may be arbitrarily fixed directly at the wall of the channel or in a measuring well. All measuring instruments may be placed at a distance therefrom in a protected room. The device has no mechanically movable parts, and the value measured can be transferred at a long distance by simple electrical cables, because the measuring current is only a few milliamperes of direct current.

For measuring the capacitive measure value a normal capacitive level meter is used, which may be graduated directly in units of flow. The total quantity is obtained with a milliampere meter, which is connected in the measuring circuit and which shows the quantity by means of a counter.

These advantages give lower establishment charges and operating costs and greater reliability in operation in comparison with conventional flow and quantity meters with float mechanisms.

The most usual types of measuring channels with a constriction, in which the invention may be used, are venturi channels, Thompson channels and Parshall channels.

I claim:

1. A device for measuring the flow of a liquid comprising in combination with an open channel with a constriction so that the liquid level before the constriction is a measure of the flow thereof, a single insulation covered capacitive electrode positioned in said channel before said constriction, said electrode being so shaped and positioned that the capacity thereof varies linearly with the flow, the shape of said electrode being determined by the formula $b = k \cdot \alpha \cdot h^{(\alpha-1)}$ in which $b$ is the horizontal dimension of the electrode at the liquid level, $k$ is a constant depending upon the unit of measurement and the dielectric constant of the insulation and $\alpha$ is a constant depending upon the shape of the constriction and means for measuring the capacity of said electrode.

2. A device as defined in claim 1 in which the electrode is shaped as a curved bar with a constant area per unit of length.

3. A device as defined in claim 1 in which the electrode is shaped as a body of varying area per unit of height.

4. A device as defined in claim 3 in which the electrode is a plane body.

5. A device as defined in claim 1 in which the insulation is a fluorinated plastic.

6. A device as defined in claim 5 in which the fluorinated plastic is polytetrafluoroethylene.

7. A device as defined in claim 5 in which the fluorinated plastic is polytrifluoro-chloroethylene.

8. A device as defined in claim 1 in which the insulation is a silicone.

References Cited by the Examiner

UNITED STATES PATENTS

| | | | |
|---|---|---|---|
| Re 23,493 | 5/1952 | Edleman | 324—61 |
| 2,103,741 | 12/1937 | Bencowitz | 324—61 |
| 2,146,371 | 2/1939 | Dunglinson | 73—213 |
| 2,622,442 | 12/1952 | Boisblanc | 324—61 |
| 2,768,368 | 10/1956 | Crane | 324—61 |
| 2,864,252 | 12/1958 | Schaschl | 324—30 |
| 2,888,640 | 5/1959 | Eckfeldt | 324—60 |

WALTER L. CARLSON, *Primary Examiner.*

W. H. BUCKLER, *Assistant Examiner.*